(12) United States Patent
Huang et al.

(10) Patent No.: US 10,334,547 B2
(45) Date of Patent: Jun. 25, 2019

(54) SIGNAL SYNCHRONIZATION METHOD AND APPARATUS FOR HIGH FREQUENCY COMMUNICATION

(71) Applicant: Huawei Technologies Co., Ltd., Shenzhen, Guangdong (CN)

(72) Inventors: Lei Huang, Shanghai (CN); Yi Wang, Shanghai (CN); Zhenyu Shi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 77 days.

(21) Appl. No.: 15/594,126

(22) Filed: May 12, 2017

(65) Prior Publication Data

US 2017/0251444 A1    Aug. 31, 2017

Related U.S. Application Data

(63) Continuation of application No. PCT/CN2014/091005, filed on Nov. 13, 2014.

(51) Int. Cl.
*H04J 3/06* (2006.01)
*H04W 56/00* (2009.01)
(Continued)

(52) U.S. Cl.
CPC ...... *H04W 56/0015* (2013.01); *H04B 17/318* (2015.01); *H04W 8/18* (2013.01);
(Continued)

(58) Field of Classification Search
CPC ......... H04W 56/0015; H04W 72/0453; H04W 8/18; H04W 24/10; H04W 64/006; H04W 16/32; H04W 16/28; H04B 17/318
(Continued)

(56) References Cited

U.S. PATENT DOCUMENTS 10,165,561 B2 * 12/2018 He .................. H04W 72/04
2008/0107072 A1 * 5/2008 Viorel .................. H04B 7/155
370/329
(Continued)

FOREIGN PATENT DOCUMENTS

CN    103168491 A    6/2013
CN    103297981 A    9/2013
(Continued)

OTHER PUBLICATIONS

IEEE Standards Association, "Part 11: Wireless LAN Medium Access Control (MAC) and Physical Layer (PHY) Specifications; Amendment 3: Enhancements for Very High Throughput in the 60 GHz Band," IEEE Computer Society, IEEE Std 802.11ad-2012 (Amendment to IEEE Std 802.11-2012, as amended by IEEE Std 802.11ae-2012 and IEEE Std 802.11aa-2012), New York, NY, Dec. 28, 2012, 628 pages.
(Continued)

*Primary Examiner* — Chuong T Ho

(57) ABSTRACT

Embodiments of the present disclosure provide a signal synchronization method and apparatus for high frequency communication, and pertain to the field of wireless communications technologies. The method includes: performing, on a first beam pair, high frequency data communication with user equipment; if it is determined that the user equipment enters a dead zone state, sending a synchronization indication signal to the user equipment, where the synchronization indication signal includes at least quick synchronization indication information and user equipment information, and the user equipment information includes user ID information, beam ID information of a beam pair, and cell ID information; sending, on a specified high frequency resource, a synchronization signal to the user equipment. In the present disclosure, high frequency data communication is implemented by quickly performing re-synchronization in a dead zone state. Therefore, communication service quality is relatively high.

20 Claims, 17 Drawing Sheets

(51) Int. Cl.
*H04W 16/28* (2009.01)
*H04B 17/318* (2015.01)
*H04W 8/18* (2009.01)
*H04W 16/32* (2009.01)
*H04W 24/10* (2009.01)
*H04W 64/00* (2009.01)
*H04W 72/04* (2009.01)

(52) U.S. Cl.
CPC ........... *H04W 16/28* (2013.01); *H04W 16/32* (2013.01); *H04W 24/10* (2013.01); *H04W 64/006* (2013.01); *H04W 72/0453* (2013.01)

(58) Field of Classification Search
USPC ......................................................... 370/350
See application file for complete search history.

(56) References Cited

U.S. PATENT DOCUMENTS

| | | | |
|---|---|---|---|
| 2013/0155847 A1 | 6/2013 | Li et al. | |
| 2013/0155991 A1 | 6/2013 | Kazmi et al. | |
| 2013/0336270 A1 | 12/2013 | Nagata et al. | |
| 2014/0321375 A1 | 10/2014 | Agiwal et al. | |
| 2017/0135081 A1* | 5/2017 | He | H04W 72/04 |
| 2018/0063828 A1* | 3/2018 | Wang | H04L 5/0023 |

FOREIGN PATENT DOCUMENTS

| | | |
|---|---|---|
| CN | 103299668 A | 9/2013 |
| GB | 2513870 A | 11/2014 |
| KR | 20140113642 A | 9/2014 |
| WO | 2013086164 A1 | 6/2013 |
| WO | 2014137832 A2 | 9/2014 |
| WO | 2014139101 A1 | 9/2014 |
| WO | 2014172306 A2 | 10/2014 |

OTHER PUBLICATIONS

IEEE, "Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension," IEEE Computer Society, IEEE Std 802.15.3c-2009 (Amendment to IEEE Std 802.15.3-2003), New York, NY, Oct. 12, 2009, 203 pages.

* cited by examiner

SIGNAL SYNCHRONIZATION METHOD AND APPARATUS FOR HIGH FREQUENCY COMMUNICATION

CROSS-REFERENCE TO RELATED APPLICATIONS

This application is a continuation of International Application No. PCT/CN2014/091005, filed on Nov. 13, 2014, the disclosure of which is hereby incorporated by reference in its entirety.

TECHNICAL FIELD

The present disclosure relates to the field of wireless communications technologies, and in particular, to a signal synchronization method and apparatus for high frequency communication.

BACKGROUND

With development of wireless communications technologies, there are more scenarios in which communication is performed by using high frequency spectrum resources such as spectrum resources beyond 6 GHz (gigahertz). In a scenario in which a high frequency communications base station performs outdoor high frequency communication with user equipment, synchronization between the high frequency communications base station and the user equipment needs to be performed before the high frequency communication is implemented.

In the prior art, during implementing signal synchronization of the high frequency communication, a beamforming technology is used, so that the high frequency communications base station can periodically send a synchronization signal on beams with different phases. The user equipment searches and compares all beams, so as to obtain a beam pair with a greatest reference signal received power, and receives the synchronization signal on the beam pair. Therefore, the signal synchronization between the high frequency communications base station and the user equipment is implemented, and subsequently, the user equipment may communicate with the high frequency communications base station by using the beam pair.

In a process of implementing the present disclosure, the inventor finds that the related technology has at least the following problems:

Because of an attenuation feature of a high frequency signal, a case of misalignment of the beams, signal interference, or the like may occur. As a result, a signal received by the user equipment is extremely weak, and normal communication cannot be implemented, that is, a communication dead zone appears. In the prior art, after the signal synchronization between the high frequency communications base station and the user equipment is implemented, in a subsequent communication process, if the communication dead zone appears, the reference signal received power of the beam pair obtained before may become weaker. Consequently, the high frequency communication cannot be continuously implemented by using the beam pair. Communication can only be switched to low frequency communication, but communication service quality of the low frequency communication is relatively poor.

SUMMARY

To resolve a problem existing in the prior art, embodiments of the present disclosure provide a signal synchronization method and apparatus for high frequency communication. The technical solutions are as follows:

According to a first aspect, a signal synchronization method for high frequency communication is provided, where the method includes:

performing, on a first beam pair, high frequency data communication with user equipment;

if it is determined that the user equipment enters a dead zone state, sending a synchronization indication signal to the user equipment, where the synchronization indication signal includes at least quick synchronization indication information and user equipment information, and the user equipment information includes user ID information, beam ID information of a beam pair, and cell ID information;

sending, on a specified high frequency resource, a synchronization signal to the user equipment; and if synchronization confirmation information of the user equipment is received, performing, on a second beam pair, the high frequency data communication with the user equipment according to second beam pair information in the synchronization confirmation information, where the second beam pair is a beam pair that has a greatest reference signal received power and that is obtained by the user equipment by performing measurement in a current synchronization process.

According to a second aspect, a signal synchronization method for high frequency communication is provided, where the method includes:

performing, on a first beam pair, high frequency data communication with a small cell;

if it is determined that user equipment enters a dead zone state, receiving a synchronization indication signal, where the synchronization indication signal includes at least quick synchronization indication information and user equipment information, and the user equipment information includes user ID information, beam ID information of a beam pair, and cell ID information;

receiving, on a specified high frequency resource, a synchronization signal sent by the small cell; and performing synchronization with the small cell according to the synchronization signal, and sending, to the small cell, synchronization confirmation information that carries second beam pair information, where a second beam pair is a beam pair that has a greatest reference signal received power and that is obtained by the user equipment by performing measurement in a current synchronization process.

According to a third aspect, a signal synchronization method for high frequency communication is provided, where the method includes:

receiving user equipment information reported by a small cell, where the user equipment information includes user ID information, beam ID information of a beam pair, and cell ID information;

sending a synchronization indication signal to user equipment and the small cell according to the user equipment information, where the synchronization indication signal includes at least quick synchronization indication information and the user equipment information, and the user equipment information includes the user ID information, the beam ID information of a beam pair, and the cell ID information; and if synchronization confirmation information of the user equipment is received, sending, to the small cell, the synchronization confirmation information that carries second beam pair information, so that the small cell performs, on a second beam pair, high frequency data communication with the user equipment, where the second beam pair is a beam pair that has a greatest reference signal received power and that is obtained by the user equipment by performing measurement in a current synchronization process.

According to a fourth aspect, a small cell is further provided, where the small cell includes:

a first communications module, configured to perform, on a first beam pair, high frequency data communication with user equipment;

a first sending module, configured to: when it is determined that the user equipment enters a dead zone state, send a synchronization indication signal to the user equipment, where the synchronization indication signal includes at least quick synchronization indication information and user equipment information, and the user equipment information includes user ID information, beam ID information of a beam pair, and cell ID information;

a second sending module, configured to send, on a specified high frequency resource, a synchronization signal to the user equipment; and a second communications module, configured to: when receiving synchronization confirmation information of the user equipment, perform, on a second beam pair, the high frequency data communication with the user equipment according to second beam pair information in the synchronization confirmation information, where the second beam pair is a beam pair that has a greatest reference signal received power and that is obtained by the user equipment by performing measurement in a current synchronization process.

According to a fifth aspect, user equipment is further provided, where the user equipment includes:

a communications module, configured to perform, on a first beam pair, high frequency data communication with a small cell;

a first receiving module, configured to: when it is determined that the user equipment enters a dead zone state, receive a synchronization indication signal, where the synchronization indication signal includes at least quick synchronization indication information and user equipment information, and the user equipment information includes user ID information, beam ID information of a beam pair, and cell ID information;

a second receiving module, configured to receive, on a specified high frequency resource, a synchronization signal sent by the small cell; and a first sending module, configured to: perform synchronization with the small cell according to the synchronization signal, and send, to the small cell, synchronization confirmation information that carries second beam pair information, where a second beam pair is a beam pair that has a greatest reference signal received power and that is obtained by the user equipment by performing measurement in a current synchronization process.

According to a sixth aspect, a macro base station is further provided, where the macro base station includes:

a receiving module, configured to receive user equipment information reported by a small cell, where the user equipment information includes user ID information, beam ID information of a beam pair, and cell ID information;

a first sending module, configured to send a synchronization indication signal to user equipment and the small cell according to the user equipment information, where the synchronization indication signal includes at least quick synchronization indication information and the user equipment information, and the user equipment information includes the user ID information, the beam ID information of a beam pair, and the cell ID information; and a second sending module, configured to: when receiving synchronization confirmation information of the user equipment, send, to the small cell, the synchronization confirmation information that carries second beam pair information, so that the small cell performs, on a second beam pair, high frequency data communication with the user equipment, where the second beam pair is a beam pair that has a greatest reference signal received power and that is obtained by the user equipment by performing measurement in a current synchronization process.

Beneficial effects of the technical solutions provided in the embodiments of the present disclosure are as follows:

After user equipment enters a dead zone state, a small cell sends a synchronization indication signal to the user equipment, so as to perform, on a second beam pair, high frequency data communication with the user equipment after re-performing, on a specified high frequency resource, synchronization with the user equipment, thereby implementing high frequency data communication by quickly performing re-synchronization in the dead zone state. Therefore, communication service quality is relatively high.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present disclosure clearer, the following further describes the embodiments of the present disclosure in detail with reference to the accompanying drawings.

For ease of explanation and description, an implementation scenario of embodiments of the present disclosure is briefly described first. In a hybrid networking scenario, both a base station used for low frequency communication and a base station used for high frequency communication exist, and the two base stations also communicate. To differentiate the two different base stations, the low frequency base station and the high frequency base station are respectively collectively referred to as a macro base station and a small cell hereinafter. In a coverage area of the macro base station, several small cells may be disposed according to a requirement. Coverage areas of the small cells are equally divided into several cells. Between the small cell and user equipment to which the small cell belongs, data information is transmitted at a high frequency, and control information is transmitted by using a low frequency. Similarly, control information is mainly transmitted between the macro base station and the small cell, and therefore is transmitted at a low frequency.

Figure 1:
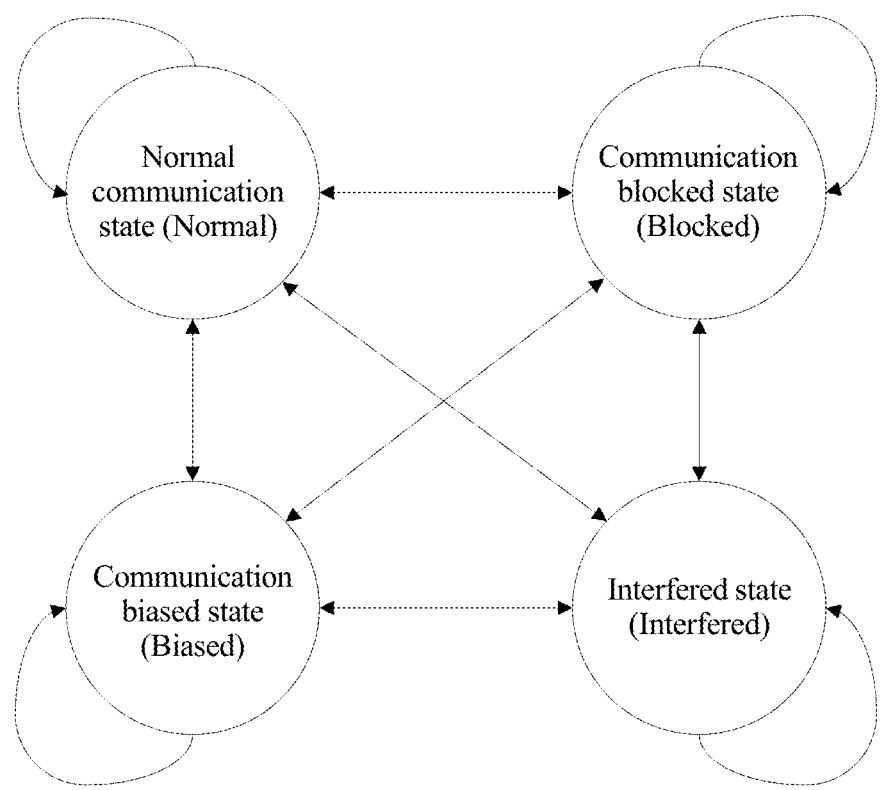
FIG. 1 is a diagram of status transition of user equipment in a high frequency communication scenario according to an embodiment of the present disclosure.

FIG. 1 is a diagram of status transition of user equipment in a high frequency communication scenario according to an embodiment of the present disclosure. Referring to FIG. 1, in this embodiment of the present disclosure, states of the user equipment may be classified into four types, that is, a normal communication state (Normal), a communication blocked state (Blocked), a communication biased state (Biased), and an interfered state (Interfered).

Specifically, the normal communication state indicates that normal high frequency communication can be performed between user equipment and a small cell. The communication blocked state indicates that a signal is blocked due to existence of an obstacle, and high frequency communication totally cannot be performed between user equipment and a small cell. The communication biased state indicates that a communications link deteriorates due to misalignment of beams when high frequency communication between user equipment and a small cell is being performed by using a beam pair, thereby affecting the high frequency communication. The interfered state indicates that a signal is extremely weak and even cannot be received, because user equipment is affected by backhaul interference when receiving a signal of a small cell, thereby affecting high frequency communication. As shown in FIG. 1, the four states may be switched at random. Three states other than the normal communication state in the four states above all belong to a dead zone state.

Figure 2:
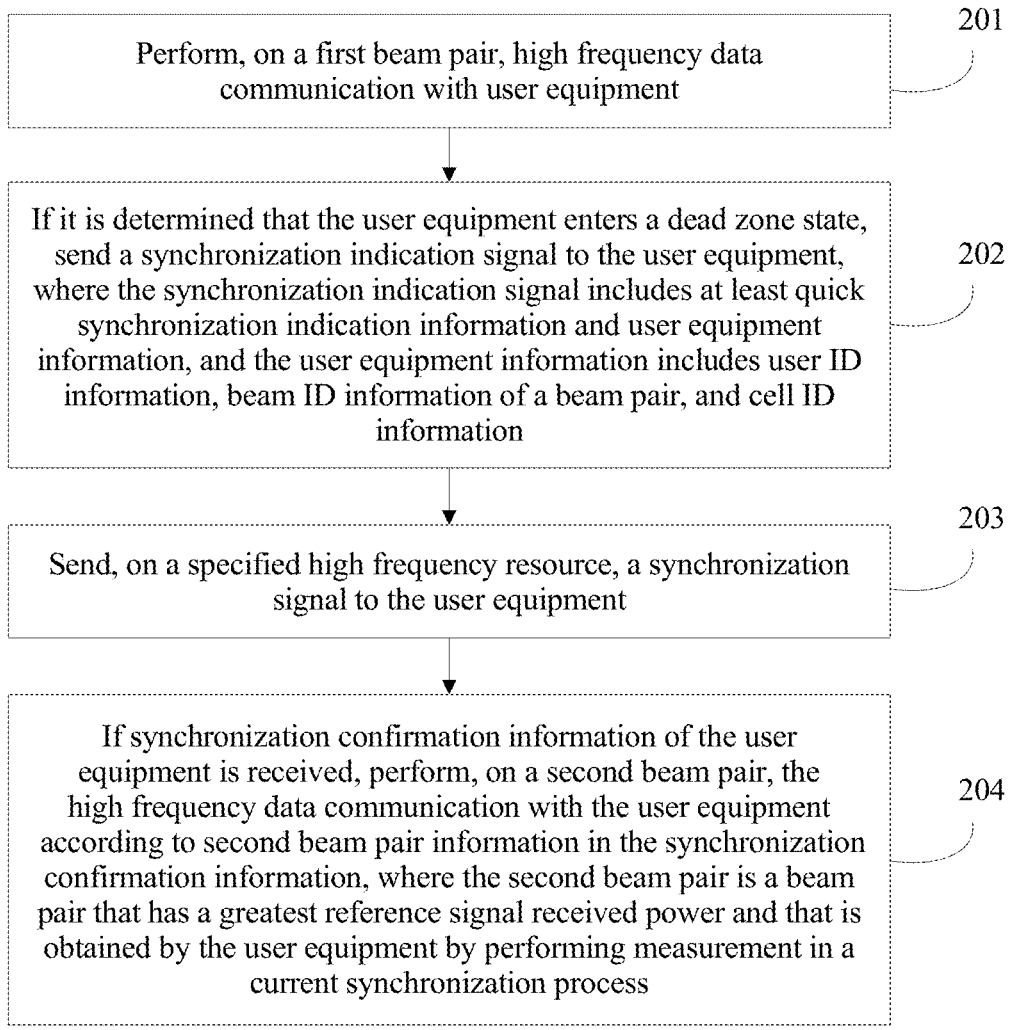
FIG. 2 is a flowchart of a signal synchronization method for high frequency communication according to an embodiment of the present disclosure.

FIG. 2 is a flowchart of a signal synchronization method for high frequency communication according to an embodiment of the present disclosure. Referring to FIG. 2, for example, from a perspective of a small cell, a method process provided in this embodiment includes:

201. Perform, on a first beam pair, high frequency data communication with user equipment.

In a high frequency communication scenario, data communication between the small cell and the user equipment is implemented by using a high frequency. To effectively compensate a free path loss in an outdoor high frequency communication scenario, a beamforming technology is used, so that the small cell can communicate with the user equipment by using a beam pair with strong directivity. Specifically, beams transmitted by the small cell and beams transmitted by the user equipment end may form beam pairs one by one. In this embodiment of the present disclosure, for the user equipment, the first beam pair is a beam pair with a greatest reference signal received power. The user equipment communicates with the small cell by using the first beam pair, so that good communication service quality can be ensured.

202. If it is determined that the user equipment enters a dead zone state, send a synchronization indication signal to the user equipment, where the synchronization indication signal includes at least quick synchronization indication information and user equipment information, and the user equipment information includes user ID information, beam ID information of a beam pair, and cell ID information.

Specifically, the quick synchronization indication information in the synchronization indication signal is used to indicate performing quick synchronization based on the signal, that is, quick re-synchronization performed after the user equipment enters the dead zone state, so that when detecting the signal, the user equipment can learn that the user equipment is currently in a synchronization process, and therefore receive a synchronization signal on a specified high frequency resource according to the synchronization indication signal. The specified high frequency resource is a time-frequency resource block that is pre-specified and that is specially used for synchronization of the user equipment.

The user equipment information includes the user ID information, the beam ID information of a beam pair, and the cell ID information. The user ID information is user equipment IDs obtained by numbering all user equipments by the small cell. In addition, in this embodiment of the present disclosure, in all directions in which the small cell may send a beam, a beam is numbered according to a natural order, so as to obtain a small cell beam ID. Similarly, a user equipment beam ID is obtained on the user equipment end, so as to record, during initial synchronization between the user equipment and the small cell, beam ID information of a beam pair with a reference signal received power that exceeds a preset threshold. Therefore, the beam ID information of a beam pair includes the small cell beam ID and the user equipment beam ID. The cell ID information is ID information of divided cells in a coverage area of the small cell. Because specified high frequency resources allocated to each cell are different, the cell ID information may enable the user equipment and the small cell to learn a specified high frequency resource on which synchronization should be subsequently performed, thereby improving efficiency of the synchronization process. In addition, the cell ID and the user ID may also enable target user equipment to confirm that the synchronization indication signal is sent to the user equipment. Certainly, in this embodiment of the present disclosure, the synchronization indication signal may also be sent to the user equipment and the small cell by a macro base station, so that quick synchronization between the user equipment and the small cell can be performed on a specified high frequency resource.

In this embodiment of the present disclosure, the user equipment enters the dead zone state, that is, because of an obstacle, signal interference, or the like, the reference signal received power of the first beam pair found by the user equipment before becomes weaker, and then the high frequency communication between the small cell and the user equipment cannot be continuously performed by using the first beam pair. Specifically, for the small cell, according to measurement information reported by the user equipment, if the reference signal received power is less than the preset threshold, or a moving speed is greater than a preset speed, or no high frequency data signal sent by the user equipment is received within a preset time period, it may be determined that the user equipment enters the dead zone state. Therefore, a subsequent signal synchronization method is performed, and signal synchronization with the user equipment is re-performed, so as to restore communication. A value of the preset time period may be set in advance by a person skilled in the art. This is not specifically limited in this embodiment of the present disclosure.

203. Send, on a specified high frequency resource, a synchronization signal to the user equipment.

204. If synchronization confirmation information of the user equipment is received, perform, on a second beam pair, the high frequency data communication with the user equipment according to second beam pair information in the synchronization confirmation information, where the second beam pair is a beam pair that has a greatest reference signal received power and that is obtained by the user equipment by performing measurement in a current synchronization process.

Specifically, the synchronization confirmation information is used to notify the small cell or the macro base station that the synchronization succeeds. The synchronization confirmation information carries the second beam pair information. The second beam pair is a beam pair that has a greatest reference signal received power and that is obtained by performing measurement in the synchronization process. The synchronization confirmation information may be directly sent to the small cell by the user equipment, or may be forwarded to the small cell by the macro base station after being sent to the macro base station by the user equipment. This is not specifically limited in this embodiment of the present disclosure.

Optionally, before the sending a synchronization indication signal to the user equipment, the method further includes:

receiving measurement information reported by the user equipment, where the measurement information includes a reference signal received power and a moving speed of the user equipment; and when the reference signal received power is less than a preset threshold, or the moving speed of the user equipment is greater than a preset speed, or no high frequency data signal sent by the user equipment is received within a preset time period, determining that the user equipment enters the dead zone state.

Optionally, before the sending a synchronization signal to the user equipment, the method further includes:

receiving multiple beam pairs recorded by the user equipment in an initial synchronization process and reference signal received powers of all the beam pairs; and selecting, from the multiple beam pairs and according to the reference signal received powers of the multiple beam pairs, a beam pair with a reference signal received power that is greater than the preset threshold, and adding beam ID information of the beam pair to the synchronization indication signal.

Optionally, after the sending, on a specified high frequency resource, a synchronization signal to the user equipment, the method further includes:

if the synchronization confirmation information of the user equipment is not received, disabling the high frequency data communication, and reporting a current communication status of the user equipment to a macro base station.

Optionally, the method further includes:

sending user equipment information to the macro base station, so that the macro base station sends the synchronization indication signal to the user equipment and the small cell.

Correspondingly, after the sending, on a specified high frequency resource, a synchronization signal, the method further includes:

if the synchronization confirmation information of the user equipment sent by the macro base station is not received, disabling the high frequency data communication, and skipping reporting the current communication status of the user equipment to the macro base station.

According to the method provided in this embodiment, after user equipment enters a dead zone state, a small cell sends a synchronization indication signal to the user equipment, so as to perform, on a second beam pair, high frequency data communication with the user equipment after re-performing, on a specified high frequency resource, synchronization with the user equipment, thereby implementing high frequency data communication by quickly performing re-synchronization in the dead zone state. Therefore, communication service quality is relatively high.

Figure 3:
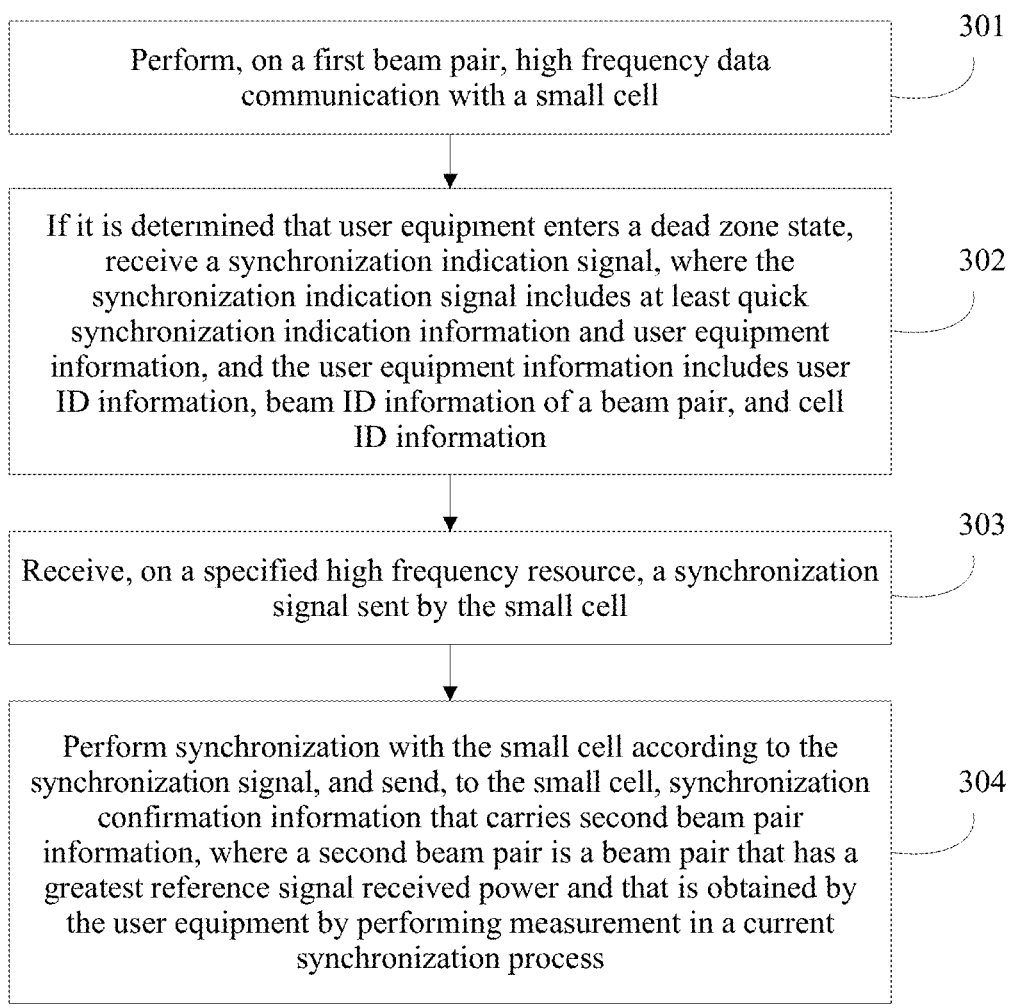
FIG. 3 is a flowchart of a signal synchronization method for high frequency communication according to an embodiment of the present disclosure.

FIG. 3 is a flowchart of a signal synchronization method for high frequency communication according to an embodiment of the present disclosure. Referring to FIG. 3, for example, from a perspective of user equipment, a method process provided in this embodiment includes:

301. Perform, on a first beam pair, high frequency data communication with a small cell.

302. If it is determined that user equipment enters a dead zone state, receive a synchronization indication signal, where the synchronization indication signal includes at least quick synchronization indication information and user equipment information, and the user equipment information includes user ID information, beam ID information of a beam pair, and cell ID information.

303. Receive, on a specified high frequency resource, a synchronization signal sent by the small cell.

304. Perform synchronization with the small cell according to the synchronization signal, and send, to the small cell, synchronization confirmation information that carries second beam pair information, where a second beam pair is a beam pair that has a greatest reference signal received power and that is obtained by the user equipment by performing measurement in a current synchronization process.

Optionally, after the performing, on a first beam pair, high frequency data communication with a small cell, the method further includes:

measuring, by the user equipment, a reference signal received power and a moving speed, and sending measurement information to the small cell at an interval of a preset time period; and when the reference signal received power is less than a preset threshold, or the moving speed of the user equipment is greater than a preset speed, or no high frequency data signal sent by the small cell is received within a preset time period, determining that the user equipment enters the dead zone state.

Optionally, the method further includes:

receiving the synchronization indication signal sent by a macro base station.

Correspondingly, the sending, to the small cell, synchronization confirmation information that carries second beam pair information includes:

sending the synchronization confirmation information to the macro base station, so that the macro base station sends, to the small cell, the synchronization confirmation information that carries the second beam pair information.

Optionally, after the receiving, on a specified high frequency resource, a synchronization signal sent by the small cell, the method further includes:

if the synchronization with the small cell cannot be implemented, disabling the high frequency data communication, and performing low frequency data communication with the macro base station.

According to the method provided in this embodiment, after entering a dead zone state, user equipment receives a synchronization indication signal, receives a synchronization signal on a specified high frequency resource, and performs re-synchronization with a small cell by using the synchronization signal, so as to perform, on a second beam pair, high frequency data communication with the small cell, thereby implementing high frequency data communication by quickly performing re-synchronization in the dead zone state. Therefore, communication service quality is relatively high.

Figure 4:
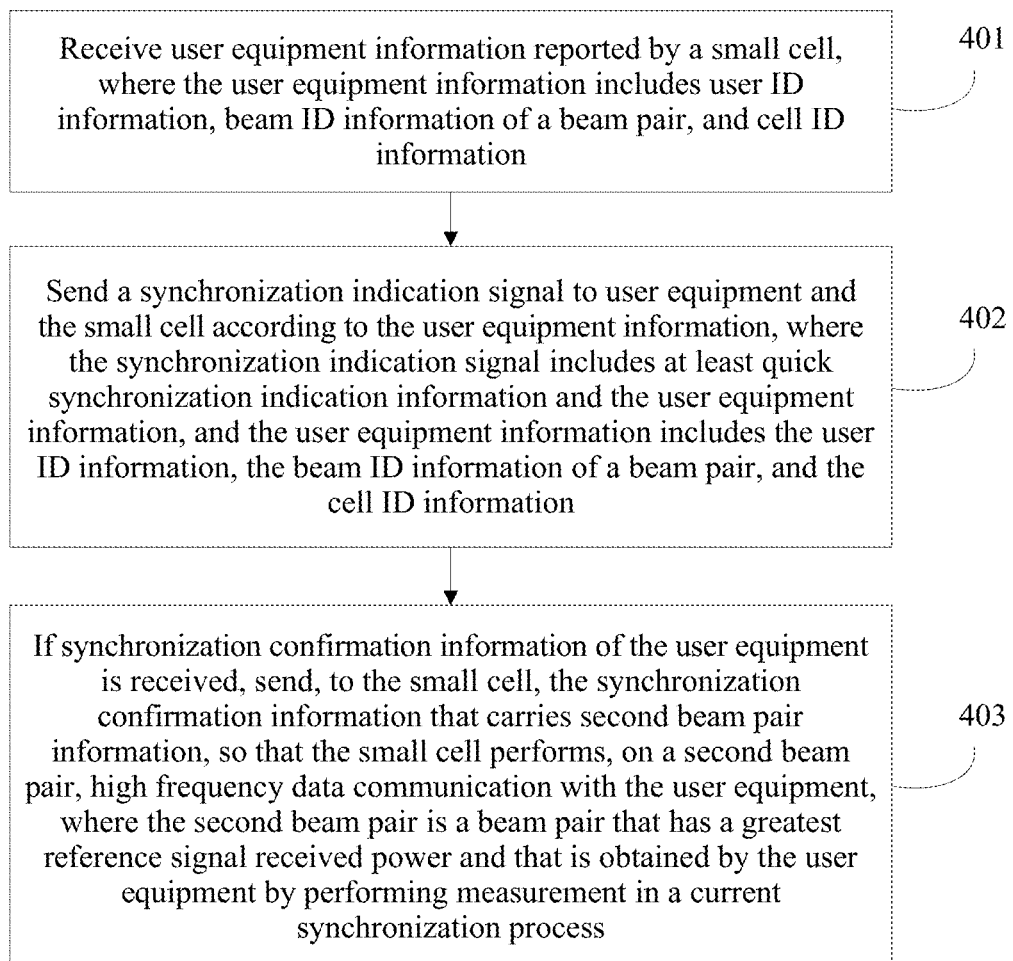
FIG. 4 is a flowchart of a signal synchronization method for high frequency communication according to an embodiment of the present disclosure.

FIG. 4 is a flowchart of a signal synchronization method for high frequency communication according to an embodiment of the present disclosure. Referring to FIG. 4, for example, from a perspective of a macro base station, a method process provided in this embodiment includes:

401. Receive user equipment information reported by a small cell, where the user equipment information includes user ID information, beam ID information of a beam pair, and cell ID information.

402. Send a synchronization indication signal to user equipment and the small cell according to the user equipment information, where the synchronization indication signal includes at least quick synchronization indication information and the user equipment information, and the user equipment information includes the user ID information, the beam ID information of a beam pair, and the cell ID information.

403. If synchronization confirmation information of the user equipment is received, send, to the small cell, the synchronization confirmation information that carries second beam pair information, so that the small cell performs, on a second beam pair, high frequency data communication with the user equipment, where the second beam pair is a beam pair that has a greatest reference signal received power and that is obtained by the user equipment by performing measurement in a current synchronization process.

Optionally, after the sending a synchronization indication signal to user equipment and the small cell according to the user equipment information, the method further includes:

if the synchronization confirmation information of the user equipment is not received, controlling the small cell to disable the high frequency data communication, and to perform low frequency data communication with the user equipment.

According to the method provided in this embodiment, after user equipment enters a dead zone state, a macro base station receives user equipment information sent by a small cell, so as to send a synchronization indication signal to the user equipment and the small cell to notify the user equipment and the small cell of a specified high frequency resource, so that the user equipment performs re-synchronization with the small cell by using the specified high frequency resource, and the small cell can perform, on a second beam pair, high frequency data communication with the user equipment, thereby implementing high frequency data communication by quickly performing re-synchronization in the dead zone state. Therefore, communication service quality is relatively high.

Figure 5A:
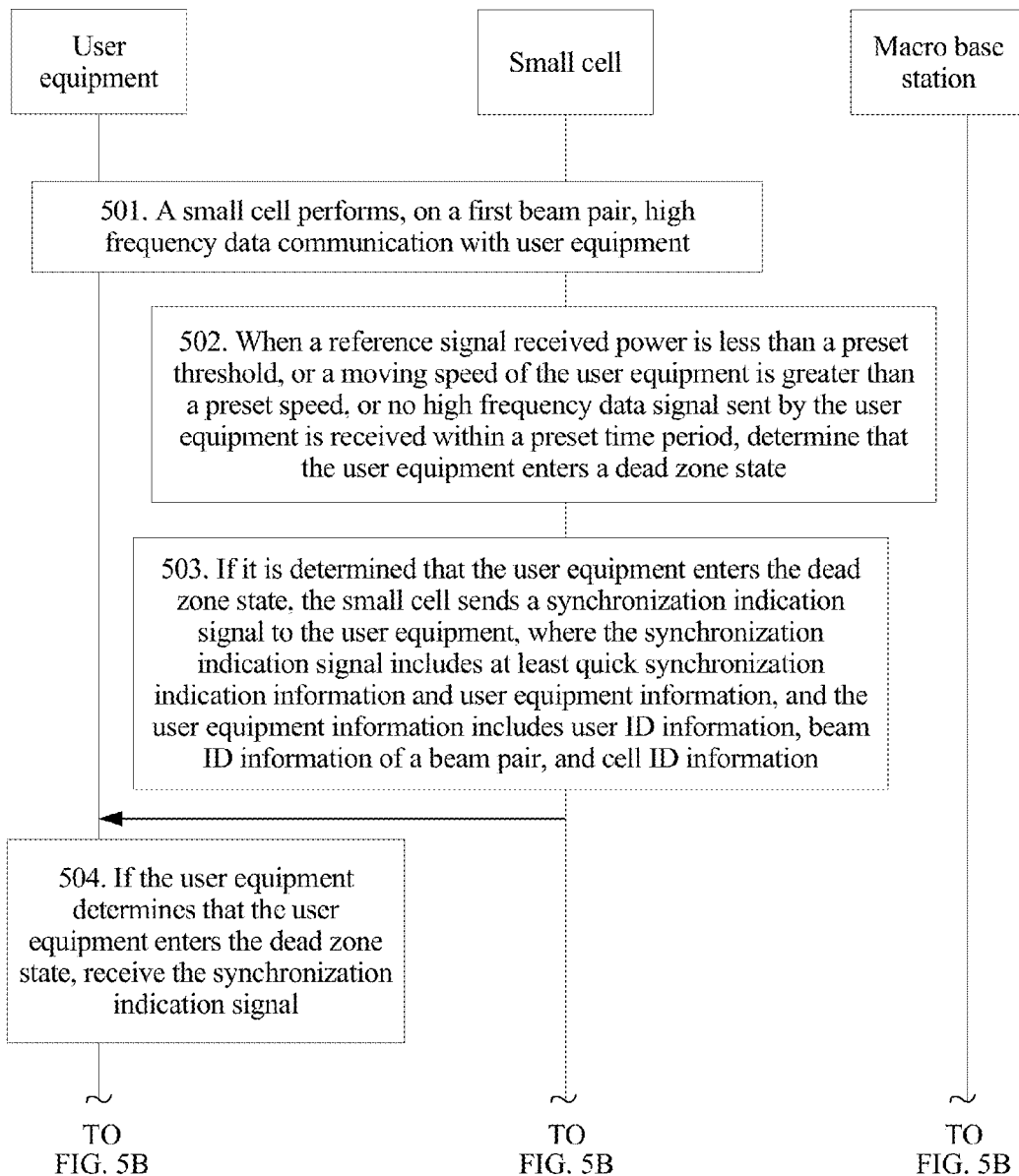
FIG. 5A and FIG. 5B are a flowchart of a signal synchronization method for high frequency communication according to an embodiment of the present disclosure.
Figure 5B:
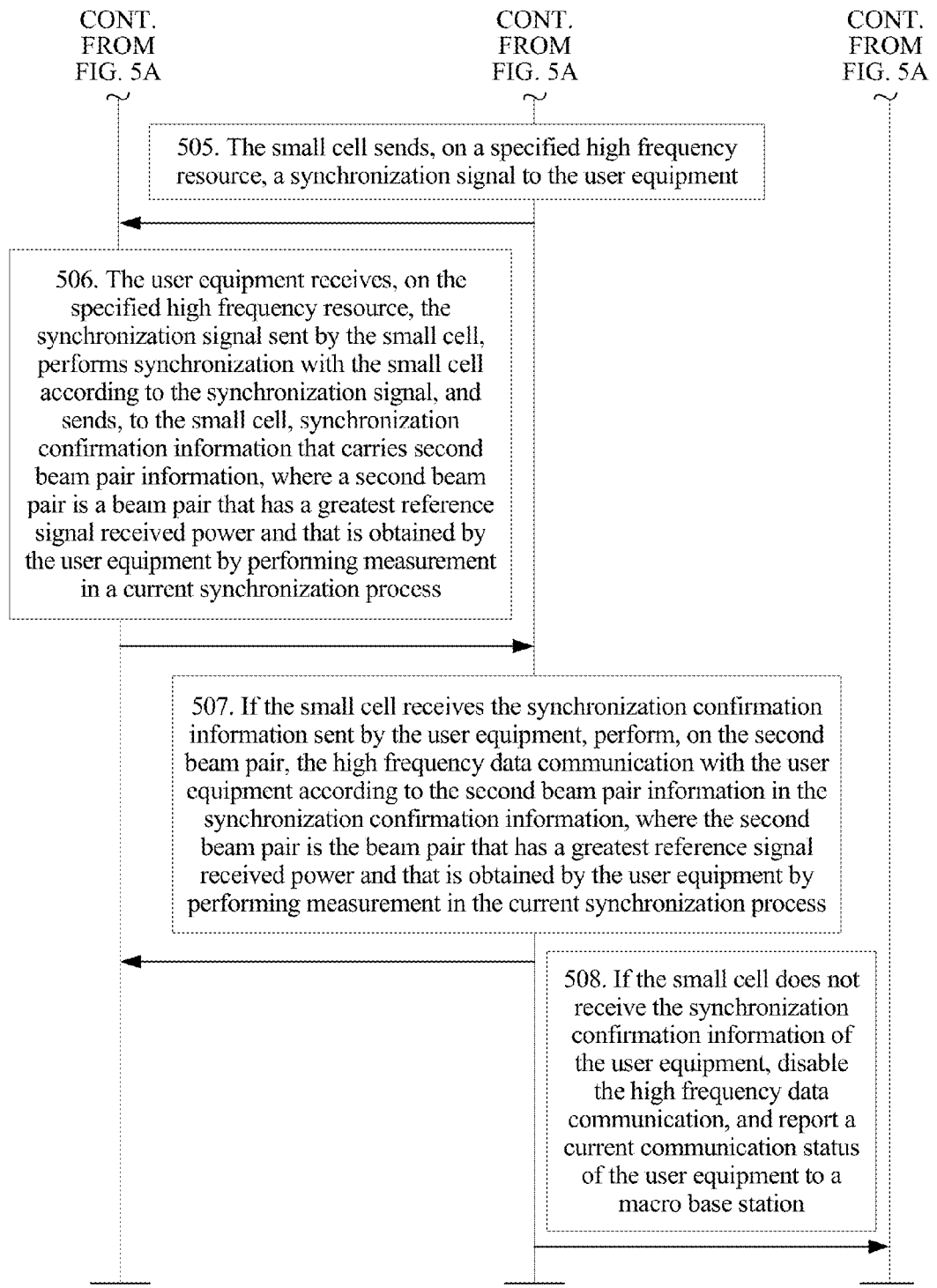

FIG. 5A and FIG. 5B are a flowchart of a signal synchronization method for high frequency communication according to an embodiment of the present disclosure. A method process provided in this embodiment includes:

501. A small cell performs, on a first beam pair, high frequency data communication with user equipment.

Before performing the high frequency data communication, the small cell broadcasts system information on multiple beams in different directions in a cell of the small cell. After the user equipment obtains a beam pair with a greatest reference signal received power by searching and comparing, according to the received system information, beams within a cell in which the user equipment is located and uses the beam pair as the first beam pair, the small cell may perform, on the first beam pair, the high frequency data communication with the user equipment.

502. When a reference signal received power is less than a preset threshold, or a moving speed of the user equipment is greater than a preset speed, or no high frequency data signal sent by the user equipment is received within a preset time period, determine that the user equipment enters a dead zone state.

Specifically, in a process of performing the high frequency data communication with the small cell, the user equipment may measure a current reference signal received power and moving speed at an interval of a preset time period, so as to obtain a measurement result, and send the measurement result to the small cell. When determining, according to the received measurement result, that the reference signal received power is less than the preset threshold, or the moving speed of the user equipment is greater than the preset speed, the small cell may determine that the user equipment enters the dead zone state, and therefore send a synchronization indication signal to the user equipment. Certainly, when no high frequency data signal sent by the user equipment is received within the preset time period, it may also be determined that the user equipment enters the dead zone state. Correspondingly, the user equipment may determine, according to the measurement result, that the user equipment currently enters the dead zone state, and therefore prepare to perform a quick re-synchronization process.

503. If it is determined that the user equipment enters the dead zone state, the small cell sends a synchronization indication signal to the user equipment, where the synchronization indication signal includes at least quick synchronization indication information and user equipment information, and the user equipment information includes user ID information, beam ID information of a beam pair, and cell ID information.

To improve synchronization efficiency and implement quick synchronization, the user equipment no longer searches and compares beams in all directions. Instead, the small cell sends beam ID information of multiple beam pairs to the user equipment, and performs synchronization on specified high frequency resources of the multiple beam pairs. Specifically, the beam ID information of the multiple beam pairs is included in the synchronization indication signal. The process of sending the synchronization indication signal is a process of sending a control signal, and therefore is implemented on a low frequency resource. In addition, the small cell sends, according to cell ID information, the synchronization indication signal to user equipment of a cell corresponding to the cell ID information.

Specifically, before the small cell sends the synchronization indication signal to the user equipment, the method includes: receiving multiple beam pairs recorded by the user equipment in an initial synchronization process and reference signal received powers of all the beam pairs; and adding, according to the reference signal received powers of the multiple beam pairs, beam ID information of a beam pair with a reference signal received power that exceeds the preset threshold to the synchronization indication signal. During specific implementation, in the initial synchronization process, that is, a process of searching for the first beam pair, one or more beam pairs with reference signal received powers that exceed the preset threshold may be recorded, or multiple beam pairs may be recorded according to a preset quantity, so as to execute a subsequent process of adding beam ID information of the beam pairs to the synchronization indication signal. After it is determined that the user equipment enters the dead zone state, the small cell sends, to the user equipment, the synchronization indication signal that carries the beam ID information of a beam pair, so that the user equipment performs synchronization on a specified high frequency resource according to the beam ID information of a beam pair.

504. If the user equipment determines that the user equipment enters the dead zone state, receive the synchronization indication signal.

Specifically, the user equipment receives, on the low frequency resource, the synchronization indication signal sent by the small cell. Further, the user equipment may learn, according to the cell ID information and the user ID information that are in the synchronization indication signal, that the synchronization indication signal is sent for the user equipment, and quickly find a corresponding time-frequency resource according to the cell ID information.

In this embodiment of the present disclosure, after receiving a synchronization indication signal, user equipment confirms, according to cell ID information and user ID information that are in the synchronization indication signal, that the synchronization indication signal is sent for the user equipment; obtains, according to the cell ID information in the synchronization indication signal, a specified high frequency resource corresponding to a cell; and obtains, from the synchronization indication signal, beam ID information of one or more beam pairs, so as to receive a synchronization signal on a specified high frequency resource of the beam pairs.

505. The small cell sends, on a specified high frequency resource, a synchronization signal to the user equipment.

Figure 6:
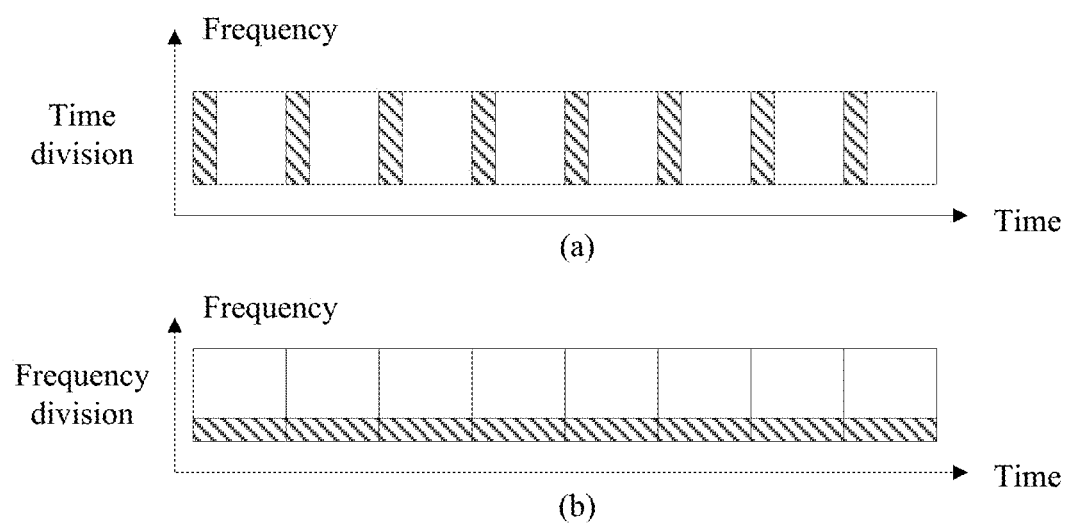
FIG. 6 is a schematic diagram of a specified high frequency resource according to an embodiment of the present disclosure.

The specified high frequency resource is a time-frequency resource block that is pre-specified and that is specially used for synchronization of the user equipment. Referring to FIG. 6, FIG. 6 is a schematic diagram of a specified high frequency resource according to an embodiment of the present disclosure. Shadow parts are the specified high frequency resource. When the synchronization signal is sent by using a time division mode, as shown in FIG. 6 (a), a lateral axis represents a time domain, and the specified high frequency resource takes up a part of time domain resources in each time period. When the synchronization signal is sent by using a frequency division mode, as shown in FIG. 6 (b), a longitudinal axis represents a frequency domain, and the specified high frequency resource takes up a specific frequency band. Certainly, in actual application, the synchronization signal may also be sent by using a space division mode. In this case, the specified high frequency resource is a time-frequency resource on a specified beam pair. This is not specifically limited in this embodiment of the present disclosure.

506. The user equipment receives, on the specified high frequency resource, the synchronization signal sent by the small cell, performs synchronization with the small cell according to the synchronization signal, and sends, to the small cell, synchronization confirmation information that carries second beam pair information, where a second beam pair is a beam pair that has a greatest reference signal received power and that is obtained by the user equipment by performing measurement in a current synchronization process.

In this embodiment of the present disclosure, because the high frequency data communication between the small cell and the user equipment is performed by using the first beam pair before, after the user equipment enters the dead zone state, the high frequency data communication cannot be continuously performed. In this case, a second beam pair with a currently greatest reference signal received power needs to be quickly found, so as to perform communication.

Specifically, the process of performing synchronization with the small cell according to the synchronization signal includes: searching and comparing, on the specified high frequency resource, beam pairs corresponding to the beam ID information of a beam pair, so as to obtain a beam pair with a greatest reference signal received power and use the beam pair as the second beam pair; and adding the second beam pair information to the synchronization confirmation information. A value of the preset threshold may be set in advance by a person skilled in the art. This is not specifically limited in this embodiment of the present disclosure.

507. If the small cell receives the synchronization confirmation information sent by the user equipment, perform, on the second beam pair, the high frequency data communication with the user equipment according to the second beam pair information in the synchronization confirmation information, where the second beam pair is the beam pair that has a greatest reference signal received power and that is obtained by the user equipment by performing measurement in the current synchronization process.

In this embodiment of the present disclosure, the synchronization confirmation information of the user equipment includes synchronized second beam pair information. If the small cell receives the synchronization confirmation information of the user equipment, the small cell may learn that the user equipment finds, on the specified high frequency resource, the second beam pair with a currently greatest reference signal received power. Therefore, the small cell may determine, according to the synchronization confirmation information, that synchronization between the user equipment and the small cell is completed, obtain the second beam pair information in the synchronization confirmation information, and re-perform the high frequency data communication with the user equipment by using the second beam pair.

508. If the small cell does not receive the synchronization confirmation information of the user equipment, disable the high frequency data communication, and report a current communication status of the user equipment to a macro base station.

After the small cell sends, on the low frequency resource, the synchronization indication signal to the user equipment, if the synchronization confirmation information of the user equipment is not received, it may be considered that the synchronization between the user equipment and the small cell does not succeed, that is, a beam pair with a reference signal received power that meets a communication need cannot be found in the beam pairs provided by the synchronization indication signal, or a link is still relatively poor and cannot meet a normal communication requirement. Therefore, the small cell disables the high frequency data communication, and reports the current communication status of the user equipment to the macro base station, so that the macro base station can perform low frequency data communication with the user equipment.

According to the method provided in this embodiment, after user equipment enters a dead zone state, a small cell re-performs, on a specified high frequency resource, synchronization with the user equipment, so as to perform, on a second beam pair, high frequency data communication with the user equipment, thereby implementing high frequency data communication by quickly performing re-synchronization in the dead zone state. Therefore, communication service quality is relatively high. Different from a quite time-consuming searching method in which during initial synchronization, all base stations are traversed and the user equipment needs to compare all beam pairs, in this embodiment of the present disclosure, a dedicated resource channel is reserved for a specified user, so as to implement quick synchronization, reduce a communication interruption probability, and ensure communication quality.

Figure 7A:
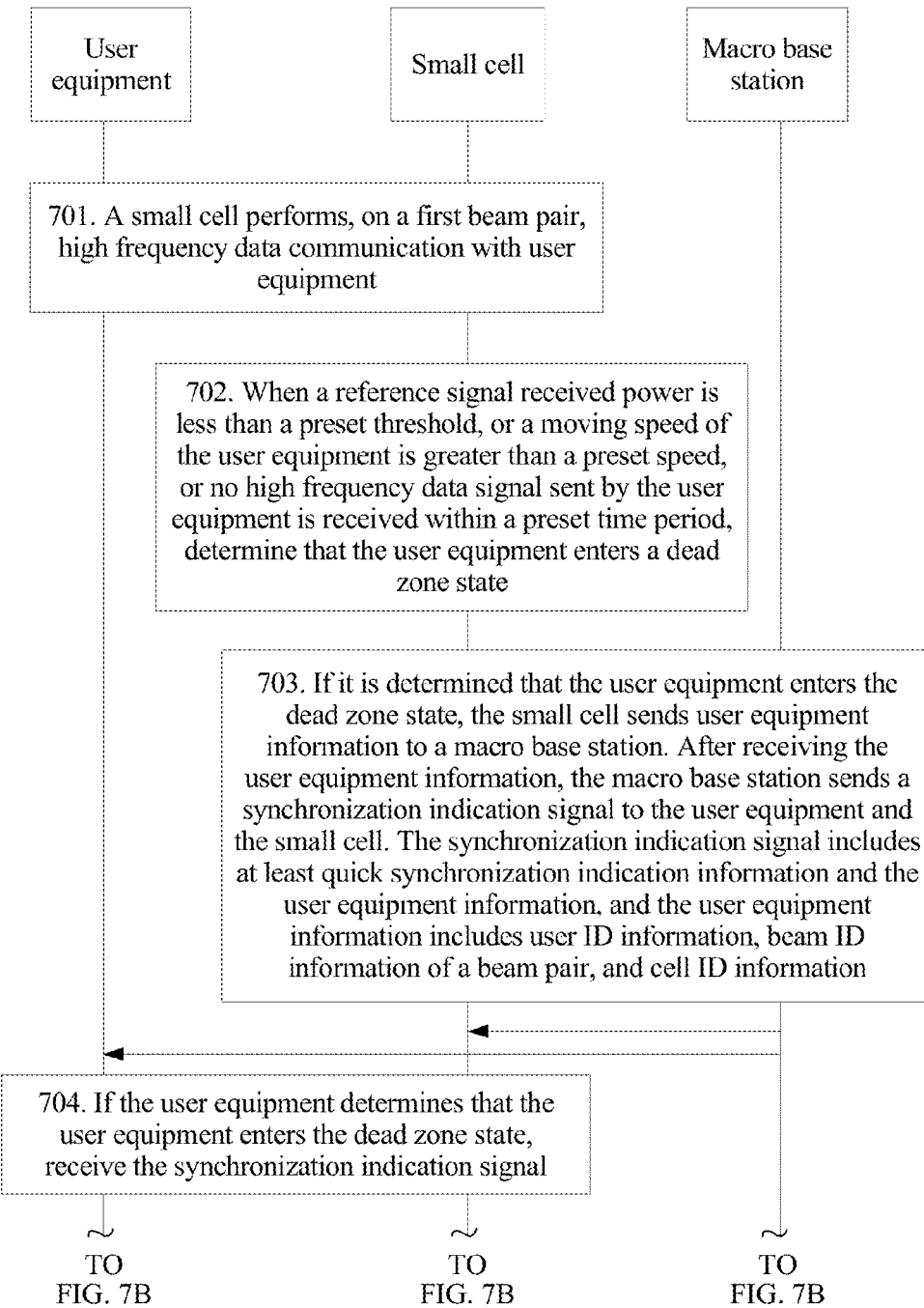
FIG. 7A and FIG. 7B are a flowchart of a signal synchronization method for high frequency communication according to an embodiment of the present disclosure.
Figure 7B:
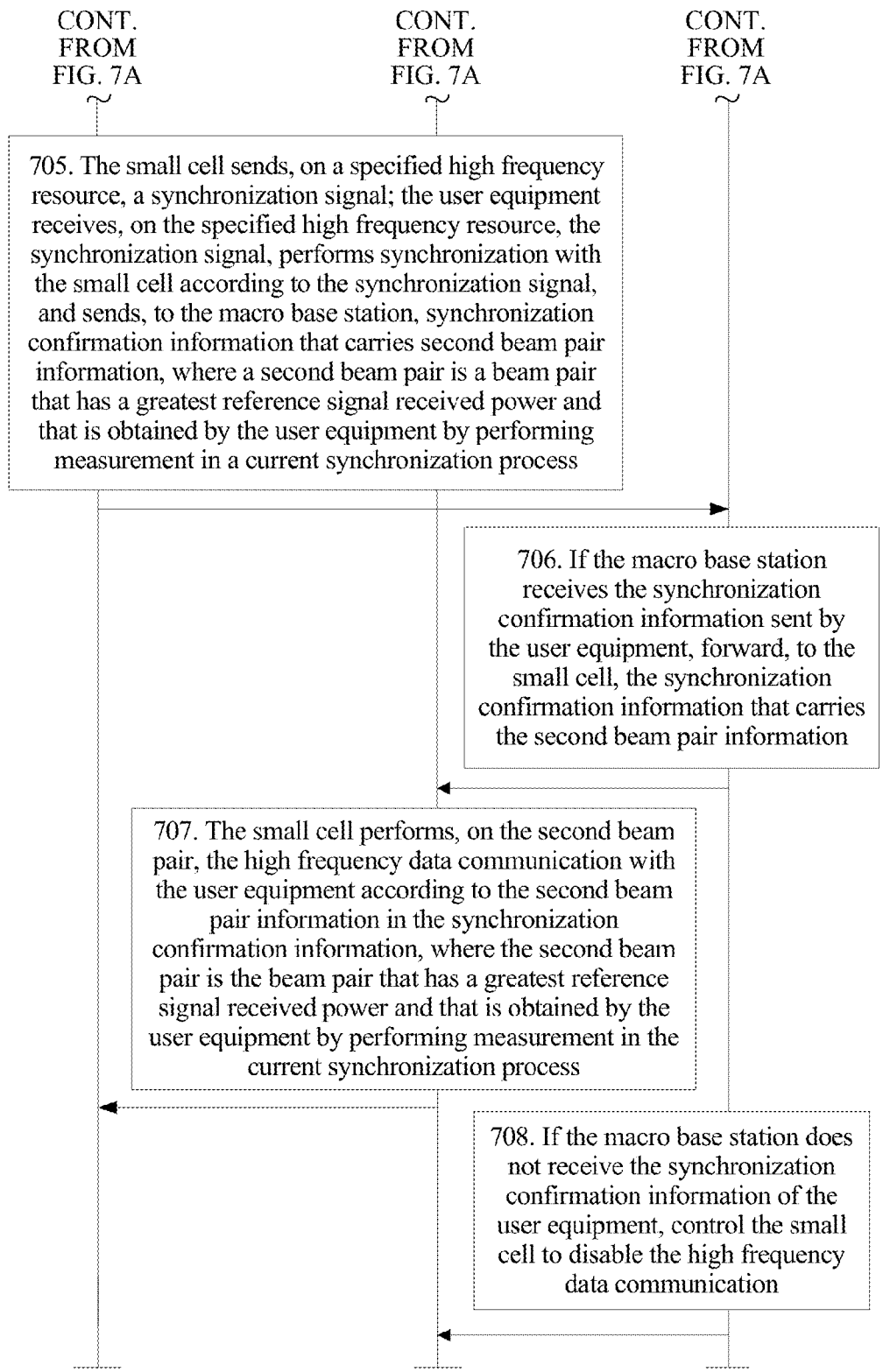

In the foregoing embodiment, transmission of control information is performed by a small cell. However, in another embodiment, the transmission of the control information may be performed by a macro base station, and only high frequency data transmission is performed between the small cell and user equipment. Correspondingly, referring to FIG. 7A and FIG. 7B, FIG. 7A and FIG. 7B are a flowchart of a signal synchronization method for high frequency communication according to an embodiment of the present disclosure. A method process provided in this embodiment includes:

701. A small cell performs, on a first beam pair, high frequency data communication with user equipment.

In this embodiment of the present disclosure, a process of step 701 is similar to a process of step 501. Details are not described herein.

702. When a reference signal received power is less than a preset threshold, or a moving speed of the user equipment is greater than a preset speed, or no high frequency data signal sent by the user equipment is received within a preset time period, determine that the user equipment enters a dead zone state.

In this embodiment of the present disclosure, a process of step 702 is similar to a process of step 502. Details are not described herein.

703. If it is determined that the user equipment enters the dead zone state, the small cell sends user equipment information to a macro base station. After receiving the user equipment information, the macro base station sends a synchronization indication signal to the user equipment and the small cell. The synchronization indication signal includes at least quick synchronization indication information and the user equipment information, and the user equipment information includes user ID information, beam ID information of a beam pair, and cell ID information.

After it is determined that the user equipment enters the dead zone state, the small cell sends the user equipment information to the macro base station, that is, the user ID information, beam ID information of a beam pair, and cell ID information, so that the macro base station can add the user equipment information to the synchronization indication signal. The macro base station sends the synchronization indication signal to the user equipment and the small cell, so that the small cell executes an operation of sending a synchronization signal on a specified high frequency resource, and therefore synchronization between the user equipment and the small cell is performed on the specified high frequency resource.

704. If the user equipment determines that the user equipment enters the dead zone state, receive the synchronization indication signal.

In this embodiment of the present disclosure, a process of step 704 is similar to a process of step 504. Details are not described herein.

705. The small cell sends, on a specified high frequency resource, a synchronization signal; the user equipment receives, on the specified high frequency resource, the synchronization signal, performs synchronization with the small cell according to the synchronization signal, and sends, to the macro base station, synchronization confirmation information that carries second beam pair information, where a second beam pair is a beam pair that has a greatest reference signal received power and that is obtained by the user equipment by performing measurement in a current synchronization process.

Specifically, the process of performing synchronization with the small cell according to the synchronization signal may be similar to a process of step 506. Details are not described herein. After sending the synchronization confirmation information to the small cell, the user equipment performs the high frequency data communication with the small cell by using the second beam pair.

706. If the macro base station receives the synchronization confirmation information sent by the user equipment, forward, to the small cell, the synchronization confirmation information that carries the second beam pair information.

After receiving the synchronization confirmation information sent by the user equipment, the macro base station further needs to forward the synchronization confirmation information to the small cell, so that the small cell can re-perform the high frequency data communication with the user equipment.

707. The small cell performs, on the second beam pair, the high frequency data communication with the user equipment according to the second beam pair information in the synchronization confirmation information, where the second beam pair is the beam pair that has a greatest reference signal received power and that is obtained by the user equipment by performing measurement in the current synchronization process.

708. If the macro base station does not receive the synchronization confirmation information of the user equipment, control the small cell to disable the high frequency data communication.

If the macro base station does not receive the synchronization confirmation information sent by the user equipment, the macro base station controls the small cell to disable the high frequency data communication. The control process may be: sending a result about unsuccessful synchronization to the small cell, so that the small cell disables the high frequency data communication after receiving the result. In this case, because the macro base station receives the synchronization confirmation information sent by the user equipment, the small cell may not report a current communication status of the user equipment to the macro base station, and the macro base station performs low frequency data communication with the user equipment.

In this embodiment of the present disclosure, if reference signal received powers of one or more beam pairs that are obtained on a corresponding specified high frequency resource and according to beam ID information of the one or more beam pairs and in the synchronization signal are all less than the preset threshold, it may be considered that the user equipment cannot perform synchronization with the small cell. Therefore, the high frequency data communication is disabled, and low frequency data communication is performed with the macro base station.

According to the method provided in this embodiment, after user equipment enters a dead zone state, a macro base station triggers quick synchronization between the user equipment and a small cell, so that the small cell re-performs, on a specified high frequency resource, synchronization with the user equipment, so as to perform, on a second beam pair, high frequency data communication with the user equipment, thereby implementing high frequency data communication by quickly performing re-synchronization in the dead zone state. Therefore, communication service quality is relatively high. Different from a quite time-consuming searching method in which during initial synchronization, all base stations are traversed and the user equipment needs to periodically compare all beam pairs, in this embodiment of the present disclosure, a dedicated resource channel is reserved for a specified user, so as to implement quick synchronization, reduce a communication interruption probability, and ensure communication quality.

Figure 8:
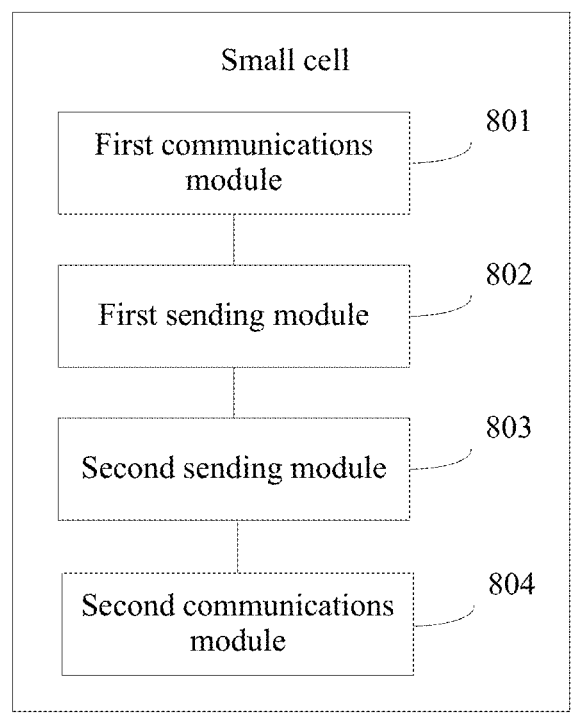
FIG. 8 is a schematic structural diagram of a small cell according to an embodiment of the present disclosure.

FIG. 8 is a schematic structural diagram of a small cell according to an embodiment of the present disclosure. The small cell is configured to execute a function executed by a small cell involved in any embodiment in all the foregoing embodiments. Referring to FIG. 8, the small cell includes:

a first communications module 801, configured to perform, on a first beam pair, high frequency data communication with user equipment;

a first sending module 802, configured to: when it is determined that the user equipment enters a dead zone state, send a synchronization indication signal to the user equipment, where the synchronization indication signal includes at least quick synchronization indication information and user equipment information, and the user equipment information includes user ID information, beam ID information of a beam pair, and cell ID information;

a second sending module 803, configured to send, on a specified high frequency resource, a synchronization signal to the user equipment; and a second communications module 804, configured to: when receiving synchronization confirmation information of the user equipment, perform, on a second beam pair, the high frequency data communication with the user equipment according to second beam pair information in the synchronization confirmation information, where the second beam pair is a beam pair that has a greatest reference signal received power and that is obtained by the user equipment by performing measurement in a current synchronization process.

Figure 9:
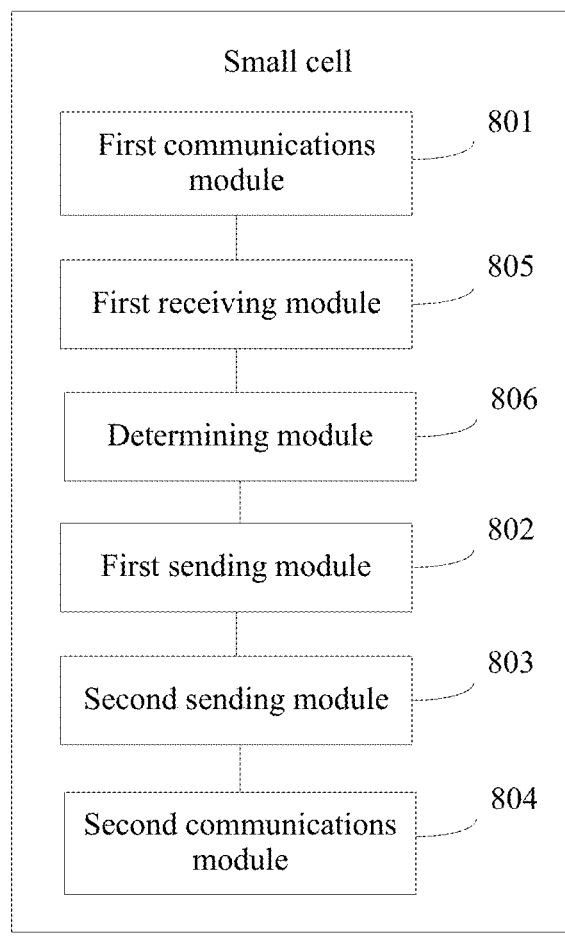
FIG. 9 is a schematic structural diagram of a small cell according to an embodiment of the present disclosure.

Optionally, referring to FIG. 9, based on the schematic structural diagram shown in FIG. 8, the small cell further includes:

a first receiving module 805, configured to receive measurement information reported by the user equipment, where the measurement information includes a reference signal received power and a moving speed of the user equipment; and a determining module 806, configured to: when the reference signal received power is less than a preset threshold, or the moving speed of the user equipment is greater than a preset speed, or no high frequency data signal sent by the user equipment is received within a preset time period, determine that the user equipment enters the dead zone state.

Figure 10:
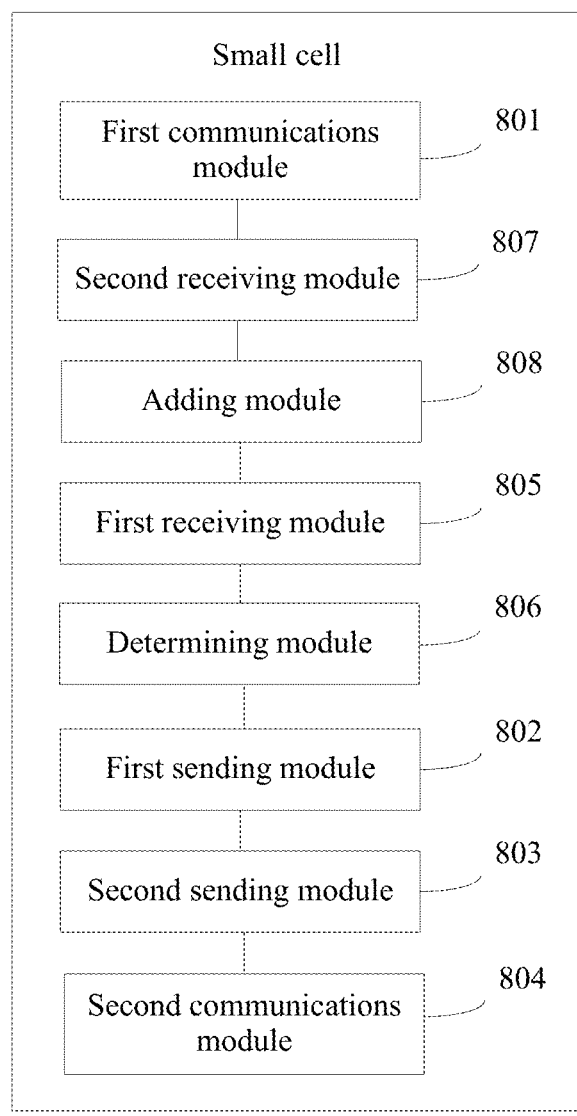
FIG. 10 is a schematic structural diagram of a small cell according to an embodiment of the present disclosure.

Optionally, referring to FIG. 10, based on the schematic structural diagram shown in FIG. 8 or FIG. 9, the small cell further includes:

a second receiving module 807, configured to receive multiple beam pairs recorded by the user equipment in an initial synchronization process and reference signal received powers of all the beam pairs; and an adding module 808, configured to: select, from the multiple beam pairs and according to the reference signal received powers of the multiple beam pairs, a beam pair with a reference signal received power that is greater than the preset threshold, and add beam ID information of the beam pair to the synchronization indication signal.

Figure 11:
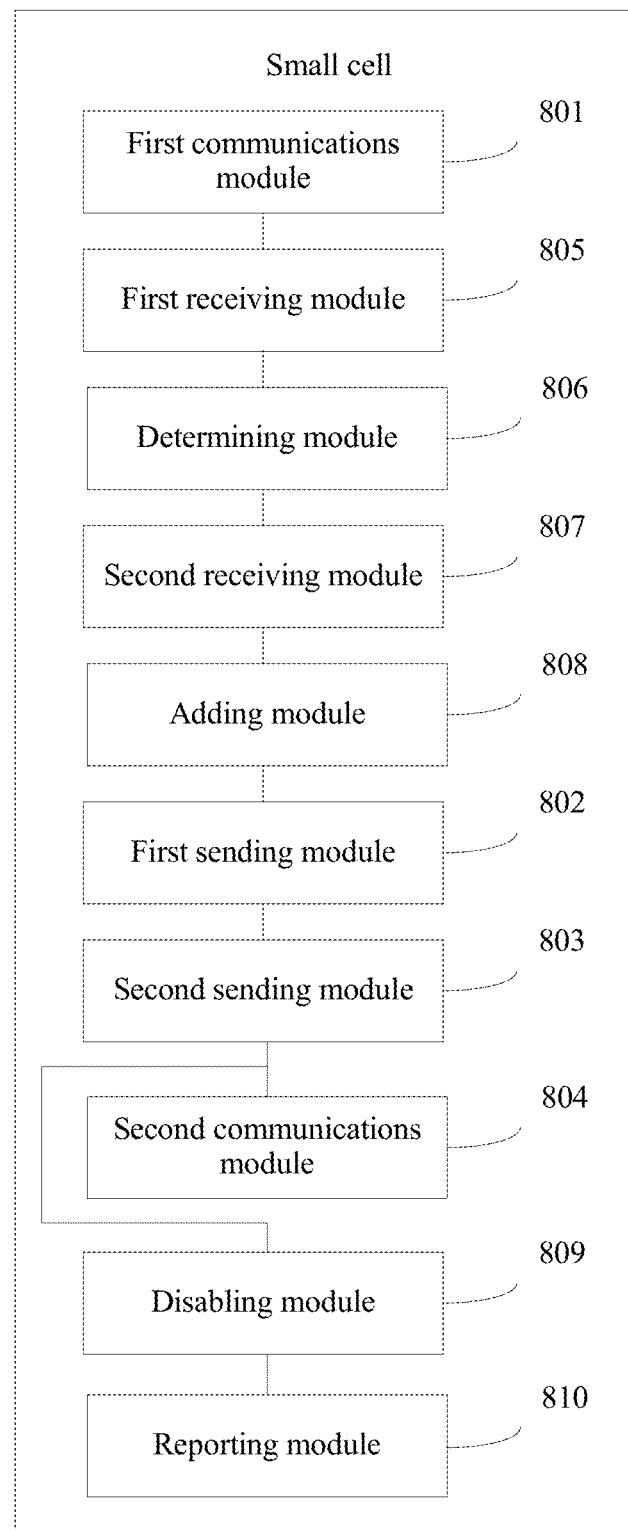
FIG. 11 is a schematic structural diagram of a small cell according to an embodiment of the present disclosure.

Optionally, referring to FIG. 11, based on the schematic structural diagram shown in FIG. 8, FIG. 9, or FIG. 10, the small cell further includes:

a first disabling module 809, configured to: when the synchronization confirmation information of the user equipment is not received, disable the high frequency data communication; and a reporting module 810, configured to report a current communication status of the user equipment to a macro base station.

Optionally, the first sending module is further configured to send the user equipment information to the macro base station, so that the macro base station sends the synchronization indication signal to the user equipment and the small cell.

Figure 12:
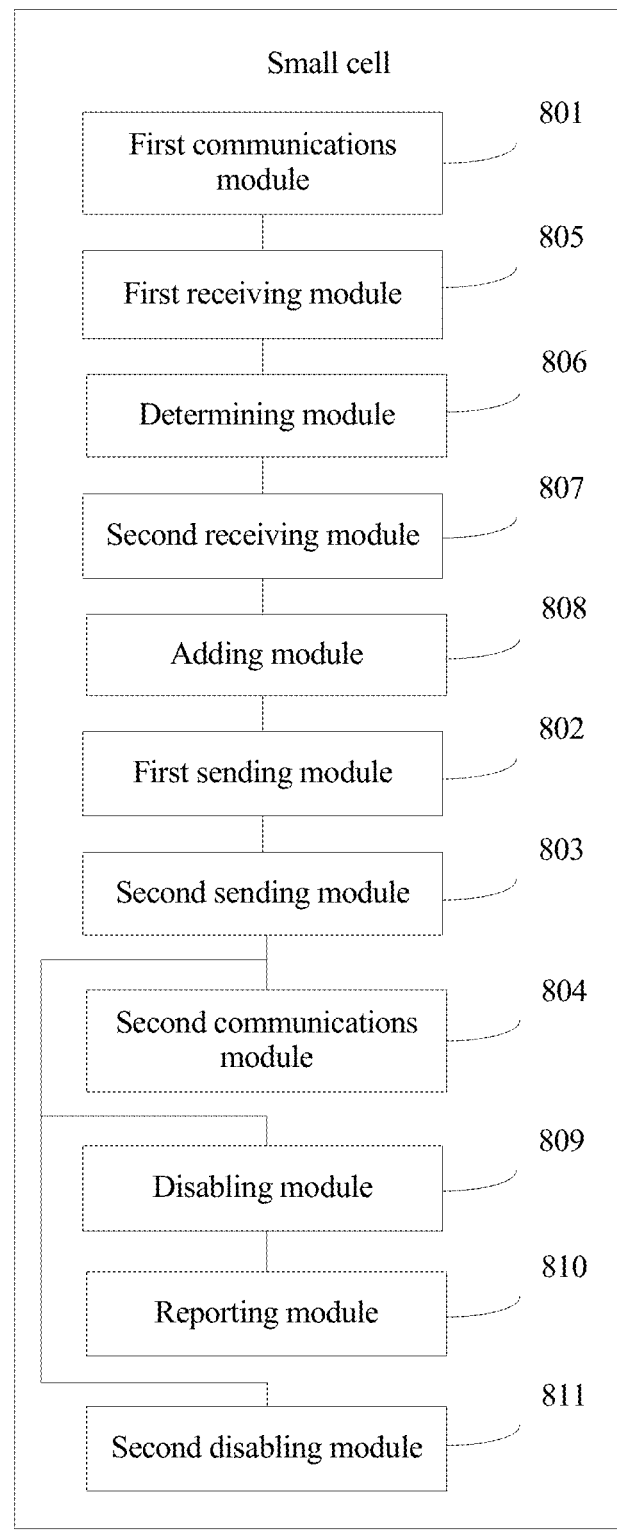
FIG. 12 is a schematic structural diagram of a small cell according to an embodiment of the present disclosure.

Correspondingly, referring to FIG. 12, based on the schematic structural diagram shown in FIG. 8, FIG. 9, FIG. 10, or FIG. 11, the small cell further includes:

a second disabling module 811, configured to: when the synchronization confirmation information of the user equipment sent by the macro base station is not received, disable the high frequency data communication, and skip reporting the current communication status of the user equipment to the macro base station.

According to the small cell provided in this embodiment, after user equipment enters a dead zone state, a small cell sends a synchronization indication signal to the user equipment, so as to perform, on a second beam pair, high frequency data communication with the user equipment after re-performing, on a specified high frequency resource, synchronization with the user equipment, thereby implementing high frequency data communication by quickly performing re-synchronization in the dead zone state. Therefore, communication service quality is relatively high.

Figure 13:
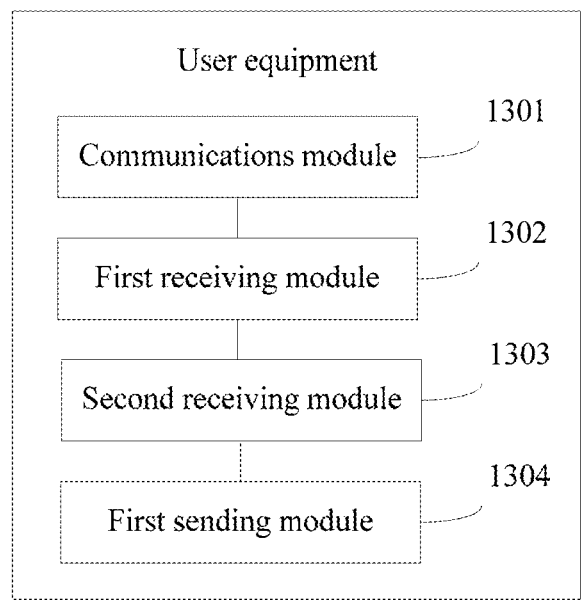
FIG. 13 is a schematic structural diagram of user equipment according to an embodiment of the present disclosure.

FIG. 13 is a schematic structural diagram of user equipment according to an embodiment of the present disclosure. The user equipment is configured to execute a function executed by user equipment involved in any embodiment in all the foregoing embodiments. Referring to FIG. 13, the user equipment includes:

a communications module 1301, configured to perform, on a first beam pair, high frequency data communication with a small cell;

a first receiving module 1302, configured to: when it is determined that the user equipment enters a dead zone state, receive a synchronization indication signal, where the synchronization indication signal includes at least quick synchronization indication information and user equipment information, and the user equipment information includes user ID information, beam ID information of a beam pair, and cell ID information;

a second receiving module 1303, configured to receive, on a specified high frequency resource, a synchronization signal sent by the small cell; and a first sending module 1304, configured to: perform synchronization with the small cell according to the synchronization signal, and send, to the small cell, synchronization confirmation information that carries second beam pair information, where a second beam pair is a beam pair that has a greatest reference signal received power and that is obtained by the user equipment by performing measurement in a current synchronization process.

Figure 14:
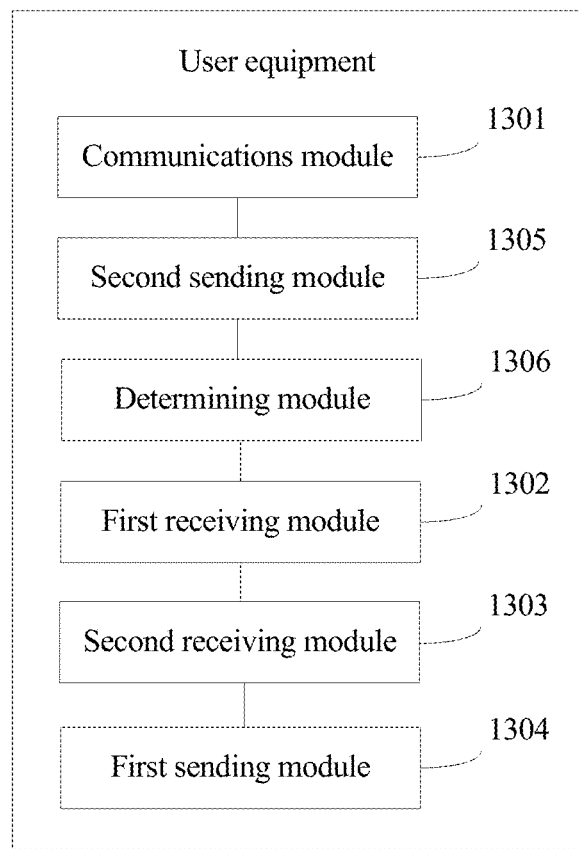
FIG. 14 is a schematic structural diagram of user equipment according to an embodiment of the present disclosure.

Optionally, referring to FIG. 14, based on the schematic structural diagram shown in FIG. 13, the user equipment further includes:

a second sending module 1305, configured to send measurement information measured by the user equipment to the small cell at an interval of a preset time period, where the measurement information includes a reference signal received power and a moving speed; and a determining module 1306, configured to: when the reference signal received power is less than a preset threshold, or the moving speed of the user equipment is greater than a preset speed, or no high frequency data signal sent by the small cell is received within a preset time period, determine that the user equipment enters the dead zone state.

Optionally, the first receiving module 1302 is further configured to receive the synchronization indication signal sent by a macro base station.

Correspondingly, the first sending module 1304 is further configured to send synchronization confirmation information to the macro base station, so that the macro base station sends, to the small cell, the synchronization confirmation information that carries the second beam pair information.

Figure 15:
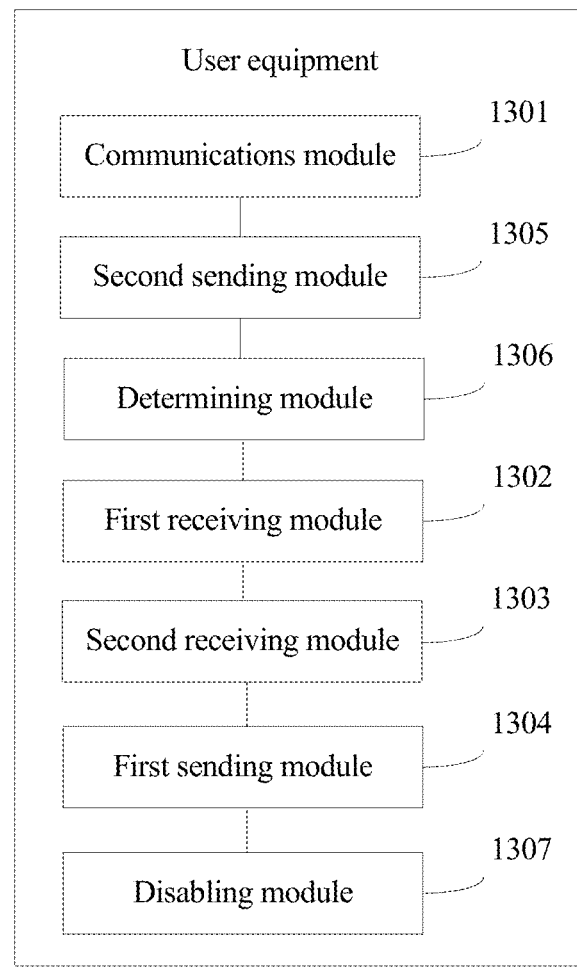
FIG. 15 is a schematic structural diagram of user equipment according to an embodiment of the present disclosure.

Optionally, referring to FIG. 15, based on the schematic structural diagram shown in FIG. 13 or FIG. 14, the user equipment further includes:

a disabling module 1307, configured to: when the synchronization with the small cell cannot be implemented, disable the high frequency data communication, and perform low frequency data communication with the macro base station.

According to the user equipment provided in this embodiment, after entering a dead zone state, user equipment receives a synchronization indication signal, receives a synchronization signal on a specified high frequency resource, and performs re-synchronization with a small cell by using the synchronization signal, so as to perform, on a second beam pair, high frequency data communication with the small cell, thereby implementing high frequency data communication by quickly performing re-synchronization in the dead zone state. Therefore, communication service quality is relatively high.

Figure 16:
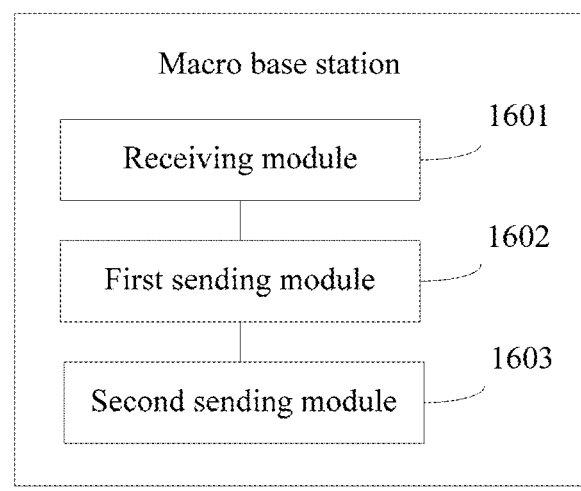
FIG. 16 is a schematic structural diagram of a macro base station according to an embodiment of the present disclosure.

FIG. 16 is a schematic structural diagram of a macro base station according to an embodiment of the present disclosure. The macro base station is configured to execute a function executed by a macro base station involved in any embodiment in all the foregoing embodiments. Referring to FIG. 16, the macro base station includes:

a receiving module 1601, configured to receive user equipment information reported by a small cell, where the user equipment information includes user ID information, beam ID information of a beam pair, and cell ID information;

a first sending module 1602, configured to send a synchronization indication signal to user equipment and the small cell according to the user equipment information, where the synchronization indication signal includes at least quick synchronization indication information and the user equipment information, and the user equipment information includes the user ID information, the beam ID information of a beam pair, and the cell ID information; and a second sending module 1603, configured to: when receiving synchronization confirmation information of the user equipment, send, to the small cell, the synchronization confirmation information that carries second beam pair information, so that the small cell performs, on a second beam pair, high frequency data communication with the user equipment, where the second beam pair is a beam pair that has a greatest reference signal received power and that is obtained by the user equipment by performing measurement in a current synchronization process.

Figure 17:
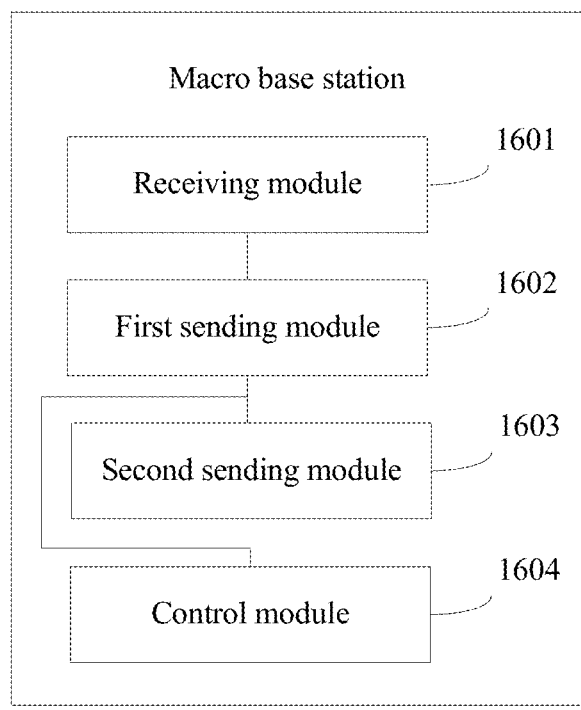
FIG. 17 is a schematic structural diagram of a macro base station according to an embodiment of the present disclosure.

Optionally, referring to FIG. 17, based on the schematic structural diagram shown in FIG. 16, the macro base station further includes:

a control module 1604, configured to: when the synchronization confirmation information of the user equipment is not received, control the small cell to disable the high frequency data communication, and to perform low frequency data communication with the user equipment.

According to the macro base station provided in this embodiment, after user equipment enters a dead zone state, a macro base station receives user equipment information sent by a small cell, so as to send a synchronization indication signal to the user equipment and the small cell to notify the user equipment and the small cell of a specified high frequency resource, so that the user equipment performs re-synchronization with the small cell by using the specified high frequency resource, and the small cell can perform, on a second beam pair, high frequency data communication with the user equipment, thereby implementing high frequency data communication by quickly performing re-synchronization in the dead zone state. Therefore, communication service quality is relatively high.

It should be noted that according to the signal synchronization method for high frequency communication provided in the foregoing embodiment, when signal synchronization for high frequency communication is being performed, description is given only by using division of the foregoing function modules. In actual application, the functions may be allocated to different function modules for implementation as required. To be specific, internal structures of an apparatus and a device are divided into different function modules to implement all or a part of the functions described above. In addition, the signal synchronization apparatus for high frequency communication provided in the foregoing embodiment pertains to a same concept as the embodiment of the signal synchronization method for high frequency communication. For a specific implementation process of the signal synchronization apparatus for high frequency communication, refer to the method embodiment. Details are not described herein.

A person of ordinary skill in the art may understand that all or some of the steps of the embodiments may be implemented by hardware or a program instructing related hardware. The program may be stored in a computerreadable storage medium. The storage medium may include: a read-only memory, a magnetic disk, or an optical disc.

The foregoing descriptions are merely examples of embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A small cell, comprising:
a processor; and
a memory coupled to the processor, the memory comprising instructions that, when executed by the processor, cause the small cell to:
   perform, on a first beam pair, high frequency data communication with user equipment,
   when it is determined that the user equipment enters a dead zone state, send a synchronization indication signal to the user equipment, wherein the synchronization indication signal comprises at least quick synchronization indication information and user equipment information, and the user equipment information comprises user ID information, beam ID information of a beam pair, and cell ID information,
   send, on a specified high frequency resource, a synchronization signal to the user equipment, and
   when receiving synchronization confirmation information of the user equipment, perform, on a second beam pair, the high frequency data communication with the user equipment according to second beam pair information in the synchronization confirmation information, wherein the second beam pair is a beam pair that has a greatest reference signal received power.

2. The small cell according to claim 1, wherein the instructions, when executed by the processor, cause the small cell to:
   receive measurement information reported by the user equipment, wherein the measurement information comprises a reference signal received power and a moving speed of the user equipment; and
   when the reference signal received power is less than a preset threshold, or the moving speed of the user equipment is greater than a preset speed, or no high frequency data signal sent by the user equipment is received within a preset time period, determine that the user equipment enters the dead zone state.

3. The small cell according to claim 1, wherein the instructions, when executed by the processor, cause the small cell to:
   receive multiple beam pairs recorded by the user equipment in an initial synchronization process and reference signal received powers of all the beam pairs; and
   select, from the multiple beam pairs and according to the reference signal received powers of the multiple beam pairs, a beam pair with a reference signal received power that is greater than the preset threshold, and add beam ID information of the beam pair to the synchronization indication signal.

4. The small cell according to claim 1, wherein the instructions, when executed by the processor, cause the small cell to:
   when the synchronization confirmation information of the user equipment is not received, disable the high frequency data communication; and
   report a current communication status of the user equipment to a macro base station.

5. The small cell according to claim 1, wherein the instructions, when executed by the processor, cause the small cell to:
   send the user equipment information to a macro base station, to enable the macro base station to send the synchronization indication signal to the user equipment and the small cell; and
   when the synchronization confirmation information of the user equipment sent by the macro base station is not received, disable the high frequency data communication, and skip reporting the current communication status of the user equipment to the macro base station.

6. User equipment, comprising:
a processor; and
a memory coupled to the processor, the memory comprising instructions that, when executed by the processor, cause the user equipment to:
   perform, on a first beam pair, high frequency data communication with a small cell,
   when it is determined that the user equipment enters a dead zone state, receive a synchronization indication signal, wherein the synchronization indication signal comprises at least quick synchronization indication information and user equipment information, and the user equipment information comprises user ID information, beam ID information of a beam pair, and cell ID information,
   receive, on a specified high frequency resource, a synchronization signal sent by the small cell, and
   perform synchronization with the small cell according to the synchronization signal, and send, to the small cell, synchronization confirmation information that carries second beam pair information, wherein a second beam pair is a beam pair that has a greatest reference signal received power and that is obtained by the user equipment by performing measurement in a current synchronization process.

7. The user equipment according to claim 6, wherein the instructions, when executed by the processor, cause the user equipment to:
   send measurement information measured by the user equipment to the small cell at an interval of a preset time period, wherein the measurement information comprises a reference signal received power and a moving speed; and
   when the reference signal received power is less than a preset threshold, or the moving speed of the user equipment is greater than a preset speed, or no high frequency data signal sent by the small cell is received within a preset time period, determine that the user equipment enters the dead zone state.

8. The user equipment according to claim 6, wherein the instructions, when executed by the processor, cause the user equipment to:
   receive the synchronization indication signal sent by a macro base station; and
   send synchronization confirmation information to the macro base station, to enable the macro base station to send, to the small cell, the synchronization confirmation information that carries the second beam pair information.

9. The user equipment according to claim 6, wherein the instructions, when executed by the processor, cause the user equipment to:
   when the synchronization with the small cell cannot be implemented, disable the high frequency data communication, and perform low frequency data communication with the macro base station.

10. A macro base station, comprising:
a processor; and
a memory coupled to the processor, the memory comprising instructions that, when executed by the processor, cause the macro base station to:
receive user equipment information reported by a small cell, wherein the user equipment information comprises user ID information, beam ID information of a beam pair, and cell ID information;
send a synchronization indication signal to user equipment and the small cell according to the user equipment information, wherein the synchronization indication signal comprises at least quick synchronization indication information and the user equipment information, and the user equipment information comprises the user ID information, the beam ID information of a beam pair, and the cell ID information; and
when receiving synchronization confirmation information of the user equipment, send, to the small cell, the synchronization confirmation information that carries second beam pair information, to enable the small cell to perform, on a second beam pair, high frequency data communication with the user equipment, wherein the second beam pair is a beam pair that has a greatest reference signal received power.

11. The macro base station according to claim 10, wherein the instructions, when executed by the processor, cause the macro base station to:
when the synchronization confirmation information of the user equipment is not received, control the small cell to disable the high frequency data communication, and to perform low frequency data communication with the user equipment.

12. A signal synchronization method for high frequency communication, the method comprising:
performing, on a first beam pair, high frequency data communication with user equipment;
when it is determined that the user equipment enters a dead zone state, sending a synchronization indication signal to the user equipment, wherein the synchronization indication signal comprises at least quick synchronization indication information and user equipment information, and the user equipment information comprises user ID information, beam ID information of a beam pair, and cell ID information;
sending, on a specified high frequency resource, a synchronization signal to the user equipment; and
when synchronization confirmation information of the user equipment is received, performing, on a second beam pair, the high frequency data communication with the user equipment according to second beam pair information in the synchronization confirmation information, wherein the second beam pair is a beam pair that has a greatest reference signal received power.

13. The method according to claim 12, wherein before sending a synchronization indication signal to the user equipment, the method further comprises:
receiving measurement information reported by the user equipment, wherein the measurement information comprises a reference signal received power and a moving speed of the user equipment; and
when the reference signal received power is less than a preset threshold, or the moving speed of the user equipment is greater than a preset speed, or no high frequency data signal sent by the user equipment is received within a preset time period, determining that the user equipment enters the dead zone state.

14. The method according to claim 12, wherein before sending a synchronization signal to the user equipment, the method further comprises:
receiving multiple beam pairs recorded by the user equipment in an initial synchronization process and reference signal received powers of all the beam pairs; and
selecting, from the multiple beam pairs and according to the reference signal received powers of the multiple beam pairs, a beam pair with a reference signal received power that is greater than the preset threshold, and adding beam ID information of the beam pair to the synchronization indication signal.

15. The method according to claim 12, wherein after sending, on a specified high frequency resource, a synchronization signal to the user equipment, the method further comprises:
when the synchronization confirmation information of the user equipment is not received, disabling the high frequency data communication, and reporting a current communication status of the user equipment to a macro base station.

16. The method according to claim 12, further comprising:
sending user equipment information to the macro base station, to enable the macro base station to send the synchronization indication signal to the user equipment and the small cell; and
wherein after sending, on a specified high frequency resource, a synchronization signal, the method further comprises:
when the synchronization confirmation information of the user equipment sent by the macro base station is not received, disabling the high frequency data communication, and skipping reporting the current communication status of the user equipment to the macro base station.

17. A signal synchronization method for high frequency communication, the method comprising:
when it is determined that user equipment enters a dead zone state, receiving a synchronization indication signal, wherein the synchronization indication signal comprises at least quick synchronization indication information and user equipment information, and the user equipment information comprises user ID information, beam ID information of a beam pair, and cell ID information;
receiving, on a specified high frequency resource, a synchronization signal sent by the small cell; and
performing synchronization with the small cell according to the synchronization signal, and sending, to the small cell, synchronization confirmation information that carries second beam pair information, wherein a second beam pair is a beam pair that has a greatest reference signal received power.

18. The method according to claim 17, wherein after performing, on a first beam pair, high frequency data communication with a small cell, the method further comprises:
measuring, by the user equipment, a reference signal received power and a moving speed, and sending measurement information to the small cell at an interval of a preset time period; and
when the reference signal received power is less than a preset threshold, or the moving speed of the user equipment is greater than a preset speed, or no high frequency data signal sent by the small cell is received within a preset time period, determining that the user equipment enters the dead zone state.

19. The method according to claim 17, further comprising:
receiving the synchronization indication signal sent by a macro base station; and
wherein correspondingly, sending, to the small cell, synchronization confirmation information that carries second beam pair information comprises:
sending the synchronization confirmation information to the macro base station, to enable the macro base station to send, to the small cell, the synchronization confirmation information that carries the second beam pair information.

20. The method according to claim 17, wherein after receiving, on a specified high frequency resource, a synchronization signal sent by the small cell, the method further comprises:
when the synchronization with the small cell cannot be implemented, disabling the high frequency data communication, and performing low frequency data communication with the macro base station.

* * * * *